UNITED STATES PATENT OFFICE.

ROBERT L. CORBY, OF WASHINGTON, DISTRICT OF COLUMBIA, ASSIGNOR, BY MESNE ASSIGNMENTS, TO THE FLEISCHMANN COMPANY, A CORPORATION OF OHIO.

METHOD OF PRODUCING MATERIALS FOR BREAD-MAKING AND COMPOSITION OF MATERIALS FOR USE AS A BREAD-DOUGH INGREDIENT.

1,355,129.  Specification of Letters Patent.  Patented Oct. 12, 1920.

No Drawing. Application filed June 15, 1917, Serial No. 175,023. Renewed July 30, 1920. Serial No. 400,215.

*To all whom it may concern:*

Be it known that I, ROBERT L. CORBY, a citizen of the United States, residing at Washington, in the District of Columbia, have invented certain new and useful Improvements in Methods of Producing Materials for Bread-Making and Composition of Materials for Use as a Bread-Dough ingredient, of which the following is a specification.

This invention relates to a method for producing compositions of material of the class of those adapted for use as initial ingredients of the dough batch formed preliminarily in making bread and to a composition of materials for use as a bread dough ingredient. Compositions of this class lead to important results and give superior qualities to the bread loaves which are formed from the dough containing them.

In order that the method of procedure which I have designed can be readily understood, I will first call attention to some of the qualities of the composition which I aim to ultimately produce.

It is a composition which (1) will insure in the bread made from dough containing it, all of the beneficial characteristics of the bread which has been heretofore made from dough containing relatively large quantities of yeast; (2) will not of itself act diastatically on the starch or other components of the flour in the dough batch; (3) will not have proteolytic action upon the nitrogenous ingredients of the flour in the dough batch; (4) will have a characteristic action of its own upon the nitrogenous components of the flour; (5) will insure a superior texture for the interior parts of the finished bread loaf; (6) will not darken the interior loaf substance, as is commonly done by malt extracts, but will insure its being as light as desired; (7) will also insure the maintenance within the interior loaf content of a quantity of moisture so that it will remain palatably moist much longer than usual; (8) will produce a palatable crust of pleasing color at relatively low temperature; (9) will enlarge the volume of the dough loaf prior to baking in a relatively short period of time; (10) will insure the maintaining of such enlarged volume until the bread loaf is finally baked; (11) will permit the reducing of the quantity of yeast to a small percentage of that ordinarily used for a given dough batch; and (12) will contain sugary components of such nature that in the making of relatively sweet doughs a larger quantity of such sugary components can be added to a given dough batch (without affecting the action of the yeast) than is the case where bodies of the cane sugar class are added to the dough batch at the time the flour of the batch and the other ingredients thereof are initially brought together.

In a suitable receptacle I place approximately proportioned quantities of cereal matters, such as rye malt, barley malt, and barley sprouts, together with a proper quantity of water. The mass is heated up to and maintained at a temperature of from $50°$ to $75°$ C. for a period of from two to five hours. In due time the starch modifying materials, such as diastase, amylase, and the like, commence to act upon it. This action, according to the character of the ingredients, will be in the nature of a liquefying of the starch and a rendering of it soluble and converting it over into saccharine bodies such as maltose, dextrose and dextrins.

I utilize such materials as the rye malt, the barley malt and barley sprouts in order to provide a suitable quantity of nitrogenous materials or proteins, and also suitable quantities of mineral salts. At the end of the period of treatment just referred to, the transformation of the starchy bodies into saccharine materials is substantially completed, and the action of the diastase, in such a given mass, terminates; but it remains, however, present, and still has capability of transforming starch into sugar if any starch be brought into contact with it.

After this saccharifying has been completed, the mass in the receptacle may, for present purposes, be regarded as comprising, together with water, (1), the dissolved or suspended sugar bodies (maltose, dextrose and dextrin) resulting from the conversion of the starch; (2) the remnant of starchy materials; (3) organized ferments, which, in one or another of various forms, are almost unavoidably present; (4) the unorganized ferments, or bodies of the enzym class, which modify starch, as diastase, amylase, or the like; (5) the unorganized ferments of the proteolytic class, which act upon nitrogenous or protein material; and (6) the proteins themselves, or nitrogenous materials, which at this stage, may be regarded as comprising some that can be bacterially digested and others that cannot, the latter including some that are coagulable and some that are not.

I next subject this mass to the following treatment, in order to produce a composition which, finally, will be (a) entirely free (so far as activity is concerned) of bodies capable of modifying starch; (b) similarly free from enzyms or ferments of the proteolytic class; (c) free, likewise, of foreign organized ferments; (d) charged with a relatively high percentage of the peculiar saccharine material obtained by inverting sugar, such as levulose, glucose, non-chrystallizable dextrose, or the like, which shall be as devoid of color as possible, even when highly heated, and which will carry and retain a relatively large amount of water, even during and through the period of baking the dough; (e) free from the coagulable proteins or nitrogenous materials which, when heated, tend to discolor the composition and the bread; and (f) which will have the other proteins or nitrogenous bodies digested and dissolved or so modified that they will not coagulate or effect discoloration even when, at a later stage, they are subjected to heat, but will be in condition to assist the selected bread ferment, such as yeast, and assist in conditioning the flour ingredients when commingled in the dough.

To attain these ends I first lower the temperature, if necessary, (after the saccharification), to, say 50° to 55° C. Then in order to obtain a relatively large quantity of inverted sugar in the mass, I introduce cane sugar in a suitable ratio, say of from 12 to 15 pounds of sugar to 20 to 25 pounds of the mass above described.

Then from a culture mass containing the bacteria of lactic acid, I introduce a suitable amount, say in a ratio of about 6 pounds of the culture to 200 to 300 pounds of the saccharified mass.

The bacteria in due time commence to act upon the maltose, dextrose and dextrin, with the generating of lactic acid, and also upon the proteids or nitrogenous materials, for the development of cell structure. The degree of acidity rapidly increases. The effects of the actions of the bacteria and the resulting lactic acid upon the various ingredients are somewhat as follows:

As concerns the unorganized ferments of the diastatic and proteolytic classes: They gradually become inactive, and I carry the acidification to the point where they are, as fully as possible, rendered inert.

The organized ferments: If any are present, they are also rendered inert.

In regard to the proteins or nitrogenous materials: Some, are acted upon by the bacteria, and are left in soluble and non-coagulable form, while others remain in such condition after the bacterial action that they can be coagulated, and these I subsequently coagulate and remove, in the way to be described, because they, upon heating, undergo a marked change in color, which is not desirable in the composition.

As concerns the sucrose or cane sugar, added as aforesaid: The activities of the bacteria and the action of the acid are such that the sugar is inverted, passing into the form manifesting the well known characteristics of inverted sugar, it becoming a mixture of levulose and glucose. It loses the capacity for crystallization and, together with the maltose, strongly persists in retaining moisture. This moisture it carries, even when highly heated, so that not only in the later treatment stage of evaporation (to be described), but even in the heating of the dough when the bread is baking, the moisture with the inverts remains, and the bread maintains the condition of freshness to a time much later than that at which ordinary bread becomes perfectly dry.

Again, the sugary bodies thus obtained by inverting the sucrose are of great value in stimulating and nourishing the yeast forming part of the dough batch, and enable me to use much less of this material for a given quantity.

And again, and of great importance, the inverted sugar is practically without color, so that the ultimately resulting composition, and the bread containing it, are much whiter than is that obtained when use is made of the ordinary malt extracts.

The bacteria and the lactic acid induce a rapid hydrolizing of the sucrose, and the inverting is rapidly effected, while the acidification is progressing.

After this acidification has, as above described, been carried to the first point, viz: where the diastase and other enzyms or ferments have been rendered inert, and then to the point where the proteids have been properly acted upon, and the sucrose has been inverted, I carry the acidifying to a point considerably beyond these degrees. I aim to have the composition quite acid at the time it is introduced into the dough, even though introduced considerably after the time of its manufacture, having found that this excess acidity is of great importance in respect to the conditioning of the dough and preparing it for the yeast.

After the acidifying treatment, and accomplishing the several purposes thereby, I again subject the mass to a comparatively high heat, for example, to a temperature of from 85° to 95° C. This is for several purposes. I coagulate the protein materials above referred to, which have not been digested or modified by the bacterial action, and which it is desirable should be removed to avoid their discoloring either the composition or the bread. Again, this high heat completes the destruction for the rendering inert of any organized ferments that may happen to have found entrance into the mass, whether at the time of initially bringing together the original components, or at some later time during the treatment. It also sterilizes the mass as concerns any lactic acid bacteria that may remain. And should there be any residue of either the diastatic or proteolytic enzyms or ferments, the heat gives assurance that such residue shall be rendered inert. And moreover, the high heat acts to complete the hydrolizing and inverting of any residue of the sucrose which may possibly escape inversion during the acidifying stage.

However, the acidification is carried to such point as to practically sterilize the composition and prevent the activity of vital micro-organism, both those then present and any that may enter subsequently.

The mass is now subjected to a filtering action, the mechanism for which may be of any suitable type, provided it be capable of properly separating the liquor element, comprising the water and its dissolved contents, from the solid parts of the mass, these including the insoluble and coagulated materials.

The liquor element so separated may for present purposes be regarded as comprising, together with the water, (1) the digested proteins or transformed soluble nitrogenous materials, together with (2) the initially produced saccharine matters, the maltose, dextrose and dextrin (remaining after acidification); (3) the inverted saccharine bodies, the levulose, glucose, fructose, etc., derived from the cane sugar; (4) the soluble starchy residues; and (5) the permanently inert ferment residues, whether of the organized or unorganized classes.

After the filtration last described, I again subject the separated liquor, with the ingredients in solution, to a relatively high heat. I find it desirable to condense the mass in volume, and I utilize a second application of heat to not only rapidly evaporate the water component but also, in connection with the prior heating and the super-acidifying, to insure sterilization.

I prefer, generally, to condense the liquor down to the point where the heavier contents, instead of being only 10 to 20% of the entire mass, are from 80 to 90%.

The composition, both before condensation and after, is clear and exceedingly light in color—in fact, is an almost colorless mass of pleasing taste, lacking the rank or pronounced tastes or flavors characteristic of the ordinary malt extracts, the latter, as well known, possessing strong flavors and well defined characteristics which, to many, are objectionable.

My composition is also superior in this respect, viz: that the invert sugars, like the maltose, dextrose and dextrins, obtained by the initial saccharification, are not crystallized in the fluid of the mass, remaining non-crystallized even after the stage of condensing. All of the invert sugar bodies, as well as the initial saccharins in the mass, are uniformly distributed and remain indefinitely in a condition of solution. The composition can therefore be stored in suitable vessels (small or large) and the mass will remain homogeneous until the time of its use. This is in contrast with the action of compositions which contain cane sugar or sucrose, or equivalent crystallizable bodies.

In order that the qualities of a composition produced by following my method may be readily understood (and also the actions of the several constituents), when introduced as an ingredient in a dough batch, attention is directed to the following:

For example, with 100 pounds of flour are mingled 62 pounds of water, 3½ pounds of the composition, 2 pounds of salt, and 10 to 12 ounces of yeast.

The dough batch containing my composition is subjected to the usual fermentation, loaf-forming, proofing and baking.

No active diastase, protease, or the like, being present, the dough is easily distinguishable from those made with any of the usual malt extracts, which, by predetermination, contain diastatic and proteolytic materials. These, when present, cause a rapid liquefying or dissolving of starch bodies in the dough, and in the presence of water and warm temperature, produce a gummy, dextrin mass. If only a little water is present, the diastatic materials may remain temporarily inert and with suspended activity during the stages of mixing, loaf-forming, and even proofing. But in the higher heat of the oven, during the baking stage, the diastase, if present, acts in its characteristic manner upon the starch, softened by the steam within the loaf, and the interior contents become, as above stated, a viscid, gummy mass; the texture is deteriorated, as well as the color, and the crust becomes harder and thicker.

All of these results are avoided with a diastatically inert composition such as is produced by my process.

Again, as described, the proteolytic materials in the composition also have been rendered inert and the degree of acidity has been carried to a point where they can not become again active during any of the cycle of bread making steps from the initial mixing of the dough to the final baking, even though there is an abundance of nitrogenous gluten and other proteins in the flour. The acidifying above referred to is not carried so far as to cause the disintegration of the gluten or other components of the flour, although it is sufficient to assist in developing the desired qualities of the gluten to increase its elasticity and stability.

The small amount of yeast which, as noted, can be used with this composition, being supplied with the dextrose and dextrin above referred to, derived from the initial starch, and also being supplied with the invert sugars (instead of being supplied with cane sugar, ordinarily used in dough batches), immediately finds a normal stimulating food at hand and is not compelled to first transform sucrose into levulose, dextrose, or equivalents, in order that it (the yeast) may have stimulation. The proteins required by the yeast for cell structure are taken not from the flour, but from the digested proteins in the composition. These have been digested during the stages of treatment above described, and as soon as the yeast is brought into their presence in the dough batch it commences immediately to work upon them, the degree of acidity not being such as to interfere with this preference of the yeast to act upon the digested proteins rather than upon those in the flour.

In brief, a small amount of yeast is sufficient to effect rapid fermentation, as it is stimulated by the maltose, dextrose, levulose, and similar saccharine bodies, and furnished with digested proteins in the composition, and is relieved of work in modifying or digesting any of the ingredients of the flour.

The loaf expands to a greater volume as the gluten is strengthened and made elastic, and maintains firmly the walls of the cells formed by the fermentation gases.

As noted, the levulose or glucose-like inverted sugars, and the maltose, are non-crystallizable and have considerable water as parts, virtually, of their constitution. This water they persist in retaining for a long period, even in high temperature. This is in contrast with a crystallizable sugar, such as cane sugar, which readily parts from the water which may accompany it, as when in solution. And upon the separation it immediately assumes again its crystalline form.

Hence, if cane sugar be added in an appreciable quantity to a dough mass, it tends to lose this water in the heat of baking, or in a relatively short period upon exposure after baking. But the invert sugars tend, as stated, to retain the water with which they are associated. The amount of the invert sugar in any one loaf is not sufficient to materially, in fact, hardly sensibly, enhance its sweetness. But it is sufficient to distribute through the interior content a quantum of water such that the loaf remains and tastes fresh and moist for a period of time considerably longer than does a loaf made with cane sugar. Moreover, the invert sugars in the form of levulose or glucose furnish the stimulation for the yeast, above described, without requiring it to first break down or modify a sugar of the sucrose class.

Above I have with some particularity described a series of steps and materials. But I do not limit myself to the specific bodies named or to the particular origins from which are obtained the ingredients of the composition, considered as an entirety.

For example, the invert sugars suitable for the several purposes described may be obtained by the introduction of the sucrose or cane sugar at a time or a stage varying from the stage or time of that above specified. It may be introduced after the termination of the acidifying stage. But I have found that under many circumstances a longer time is required in such practice to effect the complete inversion, than is the case where the inverting is carried on simultaneously with the first stage of the acidification. And even then the material should be subjected to pressure in order to effect the inverting of the sugar. Again, the sucrose may be introduced after the filtering or separation of the liquor, but here also the liquor should be subjected to pressure to economically effect the inverting. Or again, the inverting of the sucrose may be carried on as a collateral or parallel process and the inverts obtained from it may be added to the acidifying mass.

However, in any such case, the resulting composition possesses many of the desirable and essential characteristics which I have set forth. That is to say, the liquor containing the inverted sugar (whether the sucrose be introduced at one or another of the several times indicated and then inverted within the mass, or even if it be independently inverted and the inverted bodies be introduced), possesses in any of these cases many or all of the said desirable characteristics; and, by reason of its excess acidity, is incapable of diastatically modifying the starch in the flour.

Experience, however, has led me to prefer, (as concerns the stage at which the invert sugars should appear in the mass) the method first and specifically above described; that is to say, has led me to introduce the sucrose at the commencement of, or, at an early moment in, the acidifying period.

It is to be noted that equivalents (so far as concerns their saccharine qualities) of the inverted sugars can be provided in the composition without actually inverting sucrose or cane sugar; although I have found some difficulty in obtaining substitutes which have all of the excellent qualities of these inverts, as, for instance, a quality of clearness in, or lack of, color.

For example, at the time of saccharifying the initial mass, a highly starchy cereal, such as corn, can be added in suitably large quantities to the malts and sprouts, and the process of saccharifying can be carried on in such a way as to produce relatively large quantities of maltose, dextrose and dextrin. The mass so obtained from the corn and malts can be then acidified and the acidification can be carried to an excess, as above described, and it can be thereafter treated in the way above described, (except as to the introducing and inverting of sucrose) and a composition will be obtained which, so far as its activities are concerned, will be quite similar to that which I have described. But, as above noted, when I depend for saccharine materials, entirely upon the inverting of the starchy bodies by diastatic action, I meet greater difficulty in producing loaves of bread whose interior contents are fully white, or of the desired light color, and whose crusts have the desired color and consistence. The maltose produced by saccharifying the corn, or similar, starch, to some extent resembles the levulose or glucose-like bodies obtained by inverting the sucrose, particularly as concerns the hygroscopic quality of such levulose or glucose, that is, its tendency to hold its water component, even when subjected to heat; and therefore the bread remains fresh and moist for a long period, which contains the corn maltose obtained by saccharification as described.

What I claim is:

1. The herein described method of manufacturing bread dough ingredients, which consists in forming a liquid mass, containing maltose, dextrose and proteid materials derived from cereals, acidifying the mass to the point where the diastatic and proteolytic materials are rendered inactive, and then more highly acidifying the mass, causing invert sugar bodies of the levulose and glucose class to be commingled with the mass, and then condensing it by evaporation.

2. The herein described method of manufacturing bread dough ingredients, which consists in forming a liquid mass, which contains maltose, dextrose and proteid materials derived from cereals, acidifying the mass to a point where the diastatic and proteolytic materials are rendered inactive, and continuing the acidifying beyond the said point, causing invert sugars of the levulose and glucose class to be commingled with the ingredients of the mass, heating it to a sterilizing point, and then condensing it by evaporation.

3. The herein described method of manufacturing a composition of materials suitable for a bread dough batch, which consists in forming a liquid mass, containing maltose, dextrose and proteid materials derived from cereals, acidifying the mass to a point which is in excess of the acidification required to render the diastatic and proteolytic materials inactive, and inverting within the mass a body of sucrose to produce materials of the levulose and glucose class, and then condensing the mass by evaporation.

4. The herein described method of manufacturing a composition of materials suitable for a bread dough batch, which consists in forming a liquid mass, containing maltose, dextrose, and proteid materials derived from cereals, adding sucrose, acidifying the mass and simultaneously inverting the sucrose and deriving sugar bodies of the levulose and glucose class, continuing the acidification and thereby rendering inactive the diastatic and proteolytic bodies in the mass, and condensing it by evaporation.

5. The herein described method of manufacturing a composition of materials suitable for a bread dough batch, which consists in diastatically saccharifying a cereal mass containing starchy materials and proteids, acidifying the mass to a point beyond that where the diastatic and proteolytic materials are rendered inactive, causing the commingling with the components of the mass of a body of invert sugar of the levulose and glucose class, and then condensing the mass by evaporation.

6. The herein described method of manufacturing a composition of materials suitable for a bread dough batch, which consists in diastatically saccharifying a cereal mass containing starchy bodies and proteids, introducing sucrose, acidifying the mass to a point beyond that where the diastatic and proteolytic materials are rendered inactive, simultaneously inverting the sucrose to produce sugary bodies of the levulose and glucose class, heating the mass to a point where the coagulable ingredients are coagulated, and then filtering it.

7. The herein described method of manufacturing a composition of materials suitable for a bread dough batch, which consists in diastatically saccharifying a cereal mass containing starchy bodies and proteids, introducing sucrose, acidifying the mass to a point beyond that where the diastatic and proteolytic materials are rendered inactive, simultaneously inverting the sucrose to produce sugary bodies of the levulose and glucose class, heating the mass to a point where the coagulable ingredients are coagulated, filtering it, and finally condensing it by evaporation to an approximately viscid mass.

8. The herein described method of manufacturing a composition of materials suitable for a bread dough batch, which consists in forming a liquid mass containing maltose, dextrose and proteids derived by saccharifying suitable cereals, acidifying the mass to a point beyond that at which diastatic and proteolytic materials are rendered inactive, causing the commingling with the ingredients of the mass of sugars of the invert class, such as levulose and glucose, coagulating the coagulable proteids in the mass, separating the coagulates and the solid bodies, and then condensing the mass by evaporation.

9. The herein described method of manufacturing a composition of materials suitable for a bread dough batch, which consists in forming a liquid mass containing maltose, dextrose and proteid materials obtained by saccharifying suitable cereals, introducing sucrose, acidifying the mass to a point where the diastatic and proteolytic contents are maintained permanently in an inert condition, and simultaneously inverting the sucrose within the mass.

10. The herein described method of manufacturing a composition of materials suitable for a bread dough batch, which consists in forming a liquid mass containing maltose, dextrose and proteid materials derived from suitable cereals, adding sucrose, acidifying the mass to the point where the diastatic and proteolytic contents are maintained permanently in an inert condition, coagulating the discoloring proteid materials, simultaneously inverting the sucrose within the mass, separating the coagulates and non-dissolved contents, and condensing the mass by evaporation.

11. The herein described method of manufacturing a composition of materials suitable for bread dough ingredients, which consists in forming a fluid mass, which contains maltose, dextrose, proteids and sucrose, acidifying the mass to the point where the diastatic and proteolytic contents are rendered permanently inactive, and during the acidifying stage inverting the sucrose.

12. The herein described method of manufacturing a composition of materials suitable for bread dough ingredients, which consists in saccharifying a suitable cereal mass, then gradually acidifying the mass, carrying the acidification to a point where the diastatic and proteolytic materials are rendered inert, and then to a point where the mass is permanently sterilized diastatically and proteolytically, causing invert sugars of the levulose and glucose class to be commingled with the mass, separating the coagulates and solid contents from the liquor, and then condensing the liquor.

13. The herein described method of manufacturing bread dough ingredients, which consists in forming a liquid mass containing maltose, dextrose and proteid materials derived from cereals, acidifying the mass to the point where the diastatic materials are rendered inactive and are, during the stages of dough making and baking, maintained inactive, causing invert sugar bodies of the levulose and glucose class to be commingled with the mass, and then condensing it by evaporation.

14. The herein described method of manufacturing bread dough ingredients, comprising forming a liquid mass containing maltose, dextrose and proteid materials derived from cereals, digesting the nitrogenous materials of the mass, and rendering the diastatic bodies inactive, acidifying the mass sufficiently to condition the gluten and similar bodies of the dough, causing invert sugar bodies of the levulose and glucose class to be commingled with the mass, and condensing the mass by evaporation.

15. The herein described composition of materials for use as a bread dough ingredient, it consisting of a solution of saccharine bodies of the maltose and dextrose class, together with invert sugar bodies of the levulose and glucose class, and acid digested proteins, and being acidified sufficiently to render permanently inactive its diastatic and proteolytic contents.

16. The herein described composition of materials for a bread dough ingredient, it consisting of a solution of saccharine bodies of the maltose and dextrose class derived from the saccharifying of a cereal mass, invert sugar bodies derived by the inverting of sucrose, and acid digested proteins, and acidified sufficiently to render permanently inactive its diastatic and proteolytic contents.

17. The herein described composition of materials for use as a bread dough ingredient, containing saccharine bodies of the maltose and dextrose class, together with invert sugar bodies derived by the inverting of sucrose, and acid digested proteins, and acidified with an excess of acid, with its diastatic and proteolytic bodies rendered inert, but adapted to assist in conditioning gluten, while not preventing yeast from being nourished by the digested proteins and by the saccharine components.

18. The herein described composition of materials for a bread dough ingredient which is substantially free from active diastatic bodies, contains water, saccharine bodies of the maltose, dextrose and dextrin class, invert sugar bodies derived by the inverting of sucrose, and digested nitrogenous matter, and is acidified sufficiently to condition the gluten and similar bodies of the bread dough.

19. The herein described composition of materials for use as a bread dough ingredient which is substantially free from active enzyms, bacteria, or other ferments, and is characterized by saccharine bodies of the maltose, dextrose and dextrin class, invert sugar bodies derived by the inverting of sucrose, digested nitrogenous bodies, and lactic acid.

20. The herein described composition of materials for use as a bread dough ingredient containing water, saccharine bodies of the maltose, dextrose and dextrin class, invert sugar bodies derived by the inverting of sucrose, and acid-digested nitrogenous matter and acidified to the point where any diastatic bodies that may be present are rendered inactive and are, during the stages of dough making and baking, maintained inactive.

21. The herein described composition of materials for use as a bread dough ingredient which is substantially free from enzyms, bacteria, or other ferments, and is characterized by saccharine bodies of the maltose, dextrose and dextrin class, invert sugar bodies derived by the inverting of sucrose, soluble acid-digested nitrogenous bodies, and lactic acid in proportion substantially as set forth.

22. The herein described composition of materials for use as a bread dough ingredient containing saccharine bodies of the maltose, dextrose and dextrin class, and invert sugar bodies derived by the inverting of sucrose together with lactic acid and nitrogenous material rendered non-coagulable and soluble by said acid and substantially free from dough discoloring coagulates.

In testimony whereof, I affix my signature, in presence of two witnesses.

ROBERT L. CORBY.

Witnesses:
GEORGE E. EDELIN,
N. CURTIS LAMMOND.